Aug. 18, 1931.  W. S. HOBSON  1,819,242
COTTON PICKING MACHINE
Filed Nov. 9, 1929  4 Sheets-Sheet 3
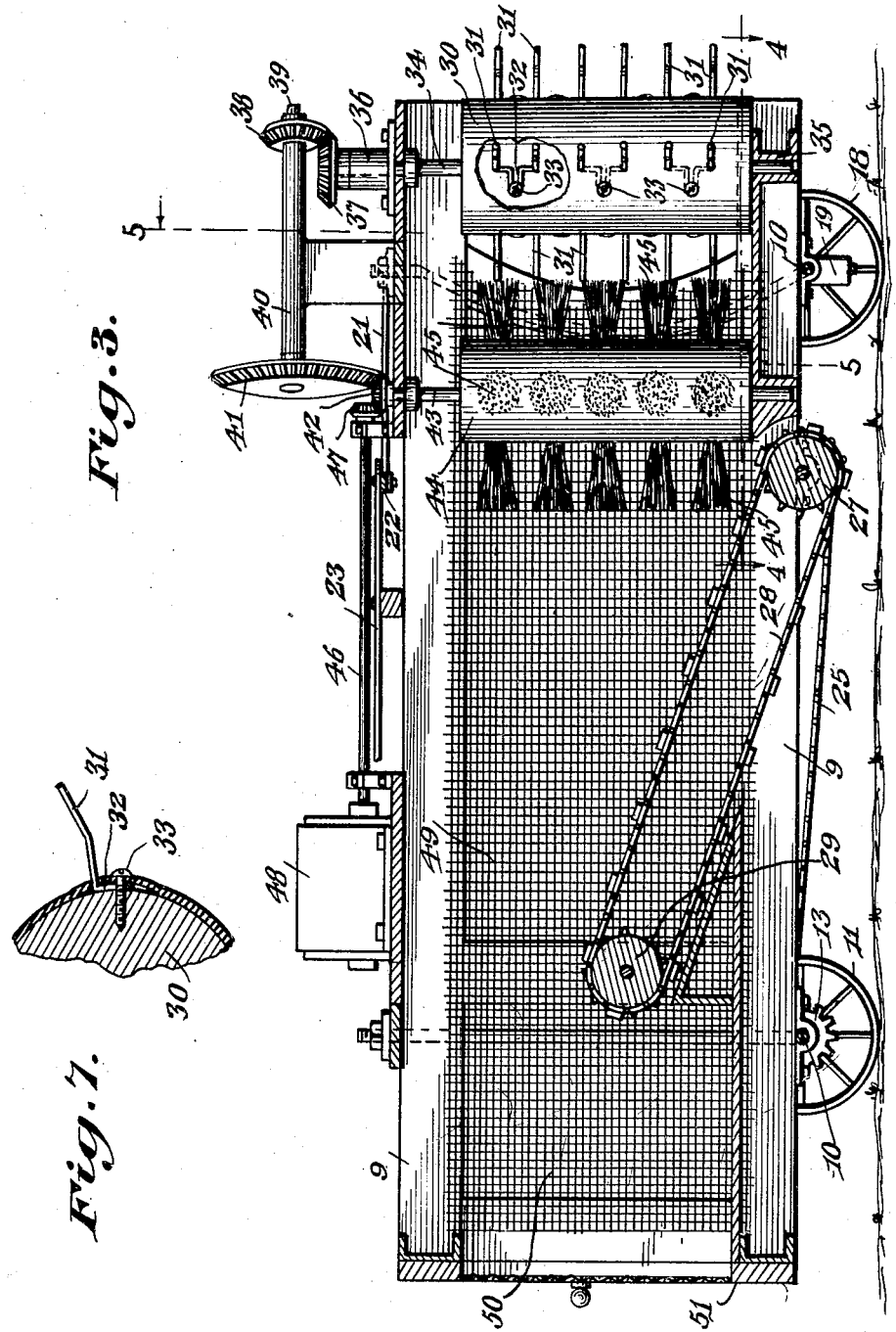
William S. Hobson, Inventor
By C.A.Snow&Co.
Attorneys.

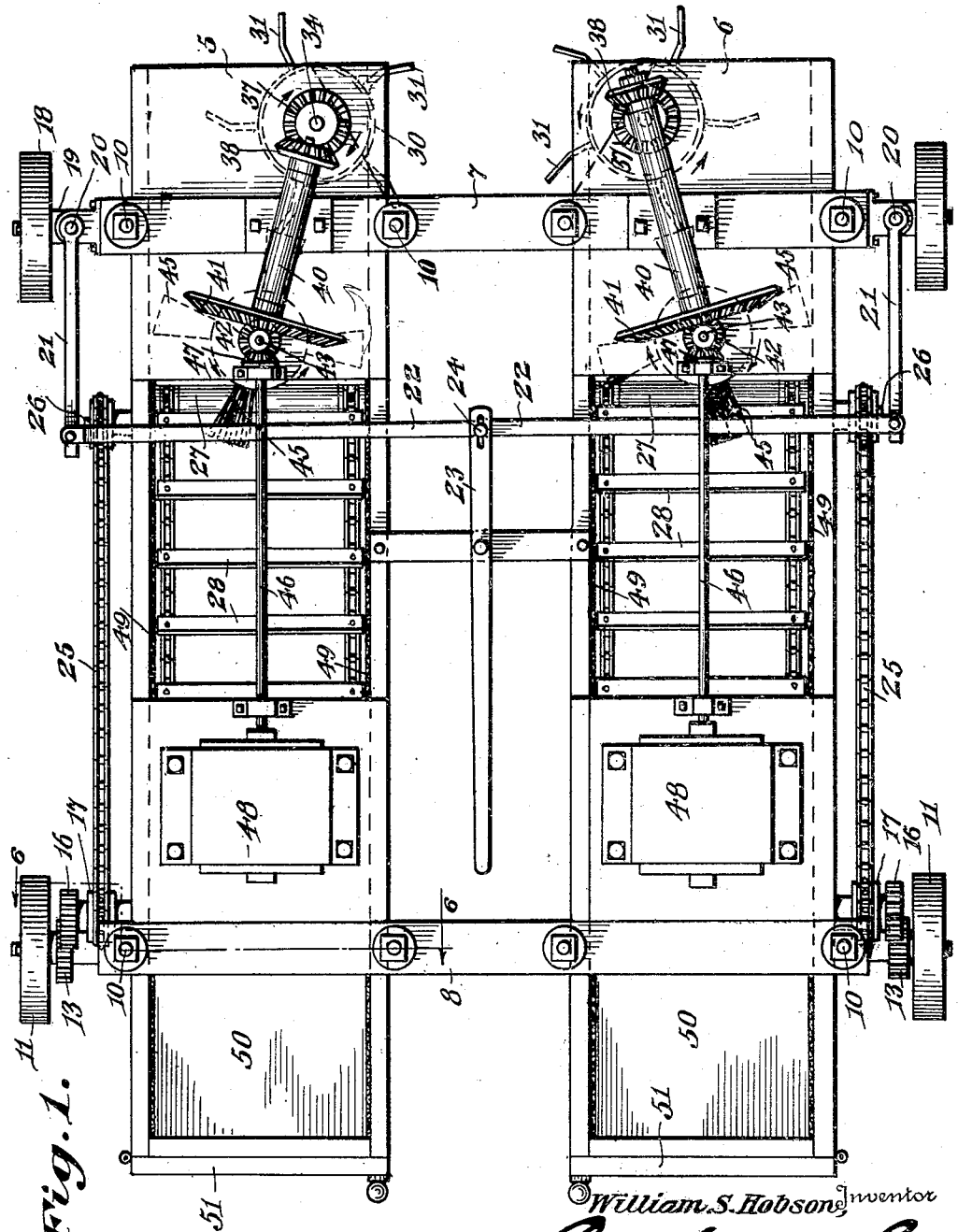

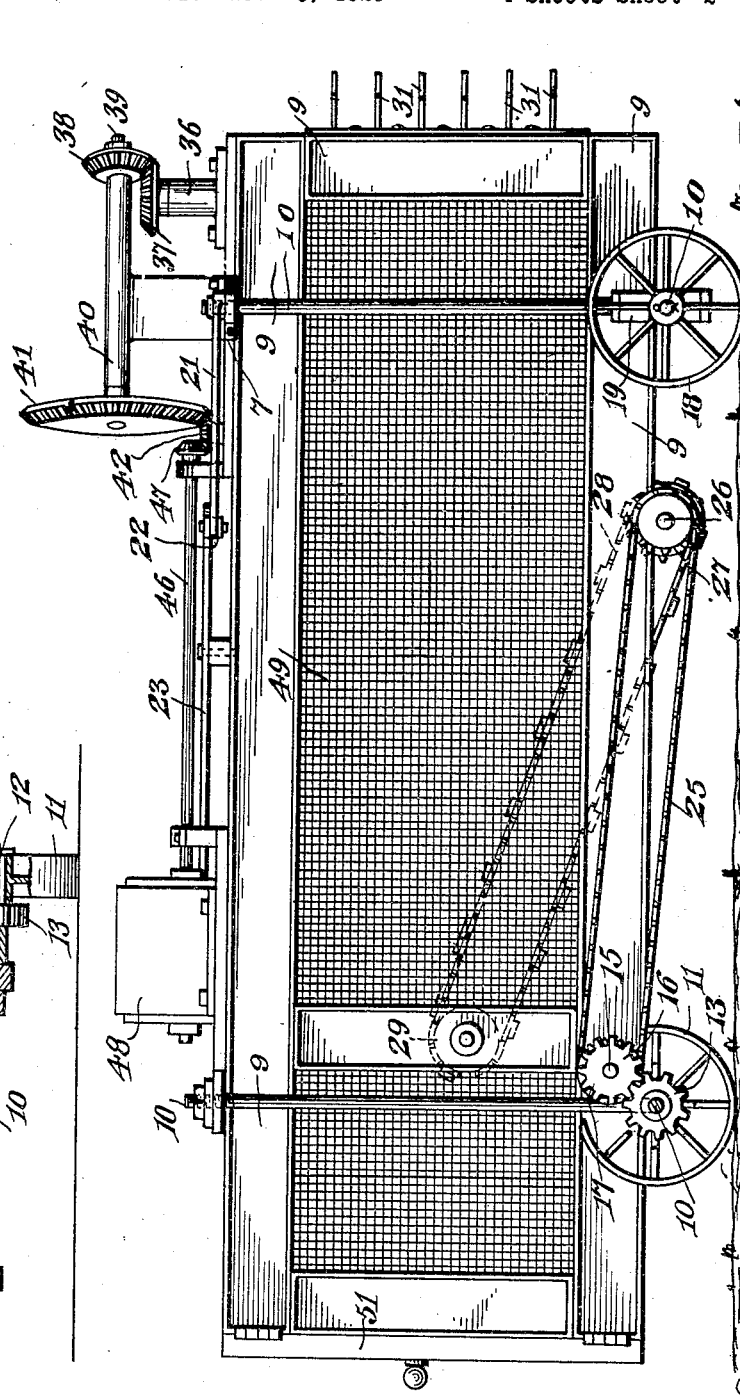

Aug. 18, 1931.      W. S. HOBSON      1,819,242
COTTON PICKING MACHINE
Filed Nov. 9, 1929      4 Sheets-Sheet 4
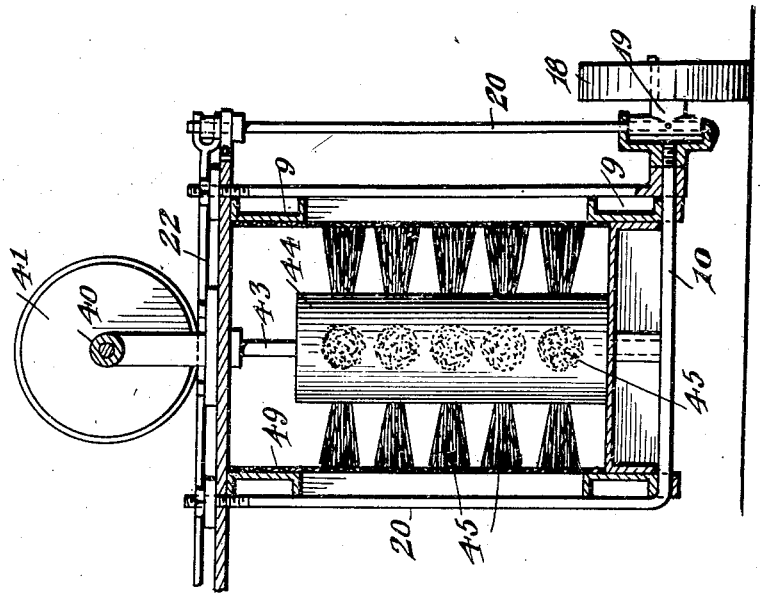
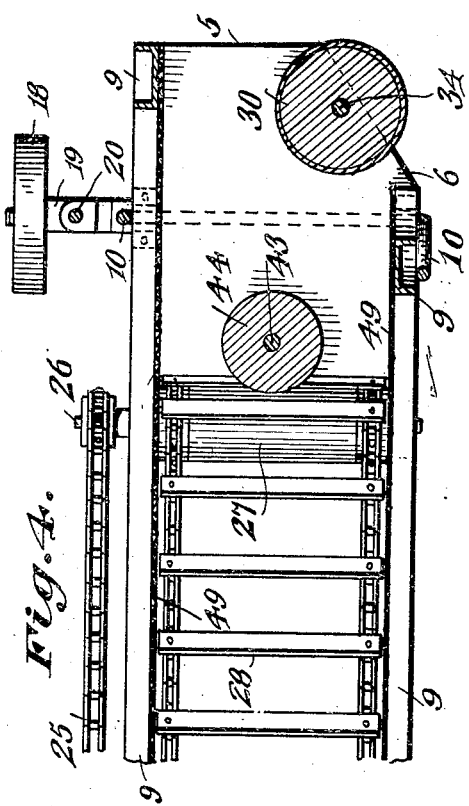
William S. Hobson, Inventor Patented Aug. 18, 1931

1,819,242

UNITED STATES PATENT OFFICE

WILLIAM S. HOBSON, OF ABERDEEN, MISSISSIPPI

COTTON PICKING MACHINE

Application filed November 9, 1929. Serial No. 406,060.

This invention relates to cotton picking machines, the primary object of the invention being to provide a machine so constructed that it may be moved along a row of cotton plants to remove the cotton from opposite sides of the plants.

An important object of the invention is to provide a machine for picking cotton, the machine being provided with picking fingers that will engage the cotton, removing it from the plants, the fingers being of a novel construction so that they will not injure the stalks and unripened bolls of the plants.

Another object of the invention is to provide means for removing the cotton from the picking fingers and delivering the cotton to an endless carrier for depositing the cotton into a receiver at the rear of the machine.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a cotton picking machine constructed in accordance with the invention.

Figure 2 is a side elevational view thereof.

Figure 3 is a longitudinal sectional view through one of the sections of the body portion.

Figure 4 is a fragmental transverse sectional view through the machine taken on line 4—4 of Figure 3.

Figure 5 is a sectional view taken on line 5—5 of Figure 3.

Figure 6 is a fragmental sectional view through the forward end of one of the sections.

Figure 7 is a fragmental detail view illustrating the manner of securing the picking fingers to the picking drums.

Referring to the drawings in detail, the machine comprises opposed sections 5 and 6 respectively, each of the sections comprising a rectangular box-like body portion, the front ends thereof being open, as clearly shown by the drawings.

The sections of the body portion are connected by means of the bars 7 and 8, the bar 7 being disposed adjacent to the forward end of the machine, while the bar 8 is positioned adjacent to the rear end thereof. Metallic frames 9 are connected with the bars 7 and 8, and extend under the sections, to support the sections. Axles 10 are provided on the frames, and accommodate the supporting wheels 11 at the rear of the machine, therebeing provided sleeves 12 on the axles 10 that have pinions 13 at one of the respective ends thereof, the sleeves and pinions being rotated with the wheels 11. Set screws 14 extend through the hubs of the wheels 11 and connect with the sleeves so that rotary movement is transmitted to the sleeves. Stub shafts 15 extend from the body portion, on which shafts the pinions 16 are mounted, the pinions being supplied with laterally extended hubs to which the sprockets 17 are secured.

The front wheels which are indicated by the reference character 18, are mounted on the axles 19 secured to the rods 20 that extend upwardly, terminating at points adjacent to the top of the machine, where they have connection with the arms 21 that in turn are connected by means of the bar 22. This bar 22 is moved laterally, by means of the steering lever 23, which is connected to the bar 22, at 24.

Chains 25 operate over the sprockets 17, and transmit movement of the sprockets 17 to the shafts 26 that extend transversely of the sections. Drums 27 are mounted on the shafts 26 and provide supports for the endless conveyors 28, which also operate over the drums 29 disposed adjacent to the rear of the machine.

The adjacent forward ends of the sections diverge, as clearly shown by Figure 4 of the drawings, so that when the machine is being moved over a row of cotton plants, the plants that are not in direct line with the space between the section of the machine, will be fed inwardly without danger of injuring the plants.

Supported at the front ends of the sections, are the picking drums 30 to which the picking fingers 31 are secured, the picking fingers 31 being mounted on strips of leather that are secured to the drums. Each finger comprises a length of flexible wire material bent upon itself to provide a loop member 32 through which the securing member 33 extends to secure the finger to the drum. Thus it will be seen that due to this construction, the fingers may flex rearwardly, when they contact with rigid stalks or green bolls, thereby preventing injury to the green bolls and plants.

The picking drums are mounted on the shafts 34 that have their lower ends mounted in the bearings 35, the upper ends of the shafts being mounted in bearings 36 supported on the upper surfaces of the sections. Beveled pinions 37 are mounted at the upper ends of the shafts 34, which pinions are in mesh with the pinions 38 mounted on the shafts 39, which shafts 39 are supported in elongated bearings 40 secured to the machine. Pinions 41 are mounted on the opposite ends of the shafts 39 and mesh with the pinions 42 carried at the upper ends of the shafts 43 on which the drums 44 are mounted.

Rows of brushes 45 are mounted on the drums 44, the brushes being of lengths to contact with the picking fingers 31 to remove the cotton from the picking fingers when the machine is in operation. As shown by Figure 1 of the drawings, the pinion 38 of one of the shafts 39 is mounted adjacent to the outer edge of the pinion 37, associated therewith, to the end that the drums on which the picking fingers are mounted, rotate in opposite directions, or in directions to pull the cotton into the machine as the cotton is being removed from the plants.

Rotary movement is transmitted to the shafts 43 and brushes mounted thereon, through the horizontal shafts 46 that are supplied with pinions 47 at their outer ends, which pinions 47 mesh with the pinions 42. These shafts 46 are operated by means of the motors 48 that are supported on the upper surface of the machine. The sides of the sections are covered with wire mesh material 49 so that the cotton will be held within the machine. Located at the rear of each section, is a receiving compartment 50 into which the cotton which has been picked, is deposited, the receiving compartments 50 being supplied with doors 51 which may be opened by the attendant, when it is desired to remove the cotton from the machine.

In the operation of the machine, the machine is moved along a row of cotton plants, the machine straddling the row. As the machine is moved over the ground surface, the picking fingers rotate, contacting with the cotton to remove the cotton from the plants. The picking fingers carry the cotton into the machine, where the cotton is removed from the picking fingers by the brushes, which deposit the cotton onto the endless carriers 28, which carry the cotton to the rear of the machine depositing the cotton in the receiving compartments.

It will be obvious that the picking fingers will spring or move rearwardly, should they contact with the stalks or green bolls of the cotton plants, thereby insuring against the picking fingers damaging the unripened bolls or plants.

I claim:

1. In a cotton picking machine, a body portion comprising spaced lateral sections, picking drums at the forward ends of the lateral sections, strips of leather stretched around the picking drums, picking fingers secured to the strips of leather to permit the fingers to bend rearwardly, rotary brushes operating adjacent to the picking fingers for removing material from the picking fingers, and endless conveyors for receiving the cotton from the brushes.

2. In a cotton picking machine, a body portion comprising spaced sections having open forward ends, cotton picking fingers operating at the front end of the machine, brushes operating adjacent to the picking fingers for removing material from the picking fingers, said brush members contacting with the walls of the sections to clean material from the brush members, and means for receiving material from the brush members.

3. In a cotton picking machine, a body portion comprising spaced sections, the side walls of the sections being covered with a foraminous material, said sections having open forward ends, cotton picking members operating in the forward ends of the sections, rotary brush members operating adjacent to the picking members to remove the cotton from the picking members, said brush members contacting with the foraminous walls of the sections to remove material from the brushes, and means for delivering material at the rear of the machine.

4. In a cotton picking machine, a body portion comprising spaced lateral sections having their forward ends open to permit material to pass thereinto, vertical drums mounted at the forward ends of the sections, picking fingers mounted on the drums, each of said picking fingers including a length of wire material bent intermediate its ends, providing an elongated loop, a securing screw extending through the loop of each picking finger, to adjustably mount the fingers on the drums, a strip of flexible material wrapped around each drum, and said flexible material having openings through which the picking fingers extend.

In testimony that I claim the foregoing as my own, I have hereto affixed my signature.

WILLIAM S. HOBSON.